(12) United States Patent
Fan (10) Patent No.: US 11,535,170 B2
(45) Date of Patent: Dec. 27, 2022

(54) POSITIONING BRACKET FOR AIR-OUTLET OF AIR-CONDITIONER IN VEHICLE

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 434 days.

(21) Appl. No.: 16/869,821

(22) Filed: May 8, 2020

(65) Prior Publication Data

US 2021/0347232 A1   Nov. 11, 2021

(51) Int. Cl.
*B60R 11/02* (2006.01)
*B60R 11/00* (2006.01)

(52) U.S. Cl.
CPC ....... *B60R 11/02* (2013.01); *B60R 2011/0008* (2013.01); *B60R 2011/0059* (2013.01); *B60R 2011/0078* (2013.01); *B60R 2011/0089* (2013.01)

(58) Field of Classification Search
CPC ..... B60R 2011/0008; B60R 2011/0059; B60R 2011/0078; B60R 11/02; B60R 2011/0089; F16B 2/12; F16M 13/022
USPC ............... 248/229.12, 229.22, 228.3, 231.41
See application file for complete search history.

(56) References Cited

U.S. PATENT DOCUMENTS

| 5,979,724 | A | * | 11/1999 | Loewenthal, Jr. | B60R 11/0241 224/560 |
| D873,261 | S | * | 1/2020 | Yin | D14/253 |
| 2009/0072106 | A1 | * | 3/2009 | Zheng | B60R 11/0235 248/231.41 |
| 2016/0174396 | A1 | * | 6/2016 | Wang | F16M 13/022 248/231.51 |
| 2016/0347257 | A1 | * | 12/2016 | Buchanan | F16M 13/00 |
| 2017/0072872 | A1 | * | 3/2017 | Balmer | B60R 11/02 |
| 2019/0241129 | A1 | * | 8/2019 | Song | B60R 11/0241 |

* cited by examiner

*Primary Examiner* — Ingrid M Weinhold
(74) *Attorney, Agent, or Firm* — Rabin & Berdo, P.C.

(57) ABSTRACT

A positioning bracket for air-outlet of air-conditioner in vehicle is provided, comprising: a shell base, a movable piece and a hook piece; the shell base comprising: a bearing base and a baffle protruding out of one side of the bearing base, with a hole in the center of the baffle; the movable piece being mounted on the bearing base and restricted to move in a direction towards the baffle without leaving the bearing base, the movable piece being abutted by a first spring to maintain tightness, the movable piece extending a connecting piece beyond the bearing base, the connecting piece being used to engage with an external mechanism, the movable piece being further disposed with an extending piece extending through the hole; the hook piece being mounted on the extending piece and the hook piece having a hook as front end. The invention is easy to operate and low-cost.

5 Claims, 10 Drawing Sheets

POSITIONING BRACKET FOR AIR-OUTLET OF AIR-CONDITIONER IN VEHICLE

BACKGROUND OF THE INVENTION

1. Field of the Invention

The present invention relates generally to a positioning bracket in vehicle, and more particularly, to a bracket to be fixed to the air-outlet of the air-conditioner in a vehicle.

2. The Prior Arts

Recently, the use of portable electronic products in vehicles has increased. The portable electronic products can be satellite navigation devices, smart mobile phones, and so on, and various types of clamping devices have been derived for clamping and fixing the portable products in the car. The position of the clamping device installed in the car can be the platform above the dashboard, the inner edge of the front windshield, and so on, the fixing mechanism can be screw, glue, suction cup, and so on. However, the above mechanisms are easy to damage the interior decoration of the car or blocking the view of the driver.

The air-outlet of air-conditioner in the vehicle is to continuously circulate and output air while the vehicle is running, blowing comfortable air to passengers and drivers. The structure of the air-outlet is often composed of a number of parallel and equally spaced blades. A plurality of blades in the same direction can be regarded as the same blade group. Some air-outlets of air-conditioner contain only one blade group, and some have two blade groups of different directions. The angle of each group can be adjusted to change the wind direction to meet the needs of driving or passengers.

At present, there are a variety of brackets that can be fixed at the air-outlet, but the operation is often complicated or inconvenient. For example, some have to turn the bolt to drive the clamp to clamp the blade. In addition, the shapes of the air-outlets or the sizes of the blade groups of are different for each vehicle, which may render some brackets unusable. Therefore, it is desirable to solve the above problems with a better design.

SUMMARY OF THE INVENTION

A primary objective of the present invention is to provide a positioning bracket for the air-conditioning air-outlet in vehicle, through rotating and pushing so that the hook can be adjusted and extended to hook on the blades in the air-outlet, which simplifies the operation, is fast, convenient and easy to meet the needs of users.

Another objective of the present invention is to provide a low-cost, easy-to-manufacture positioning bracket for air-outlet of air-conditioner in vehicle.

To achieve the above objectives, the present invention provides a positioning bracket for air-outlet of air-conditioner in vehicle, comprising: a shell base, a movable piece and a hook piece; the shell base comprising: a bearing base and a baffle protruding out of one side of the bearing base, with a hole in the center of the baffle; the movable piece being mounted on the bearing base and restricted to move in a direction towards the baffle without leaving the bearing base, the movable piece being abutted by a first spring to maintain tightness, the movable piece extending a connecting piece beyond the bearing base, the connecting piece being used to engage with an external mechanism, the movable piece being further disposed with an extending piece extending through the hole; the hook piece being mounted on the extending piece and the hook piece having a hook as front end.

In a preferred embodiment of the present invention, the bearing base has a circular inner wall, the movable piece is mounted in a chamber formed by the circular inner wall; the extending piece has a plurality of protruding portions, the protruding portions are latched outside the baffle so that the movable piece can move on the bearing base without being disengaged.

In a preferred embodiment of the present invention, a plurality of guide bars are distributed on the circular inner wall adjacent to the baffle, a plurality of slide grooves are provided in an inner ring of outer wall of the shell base, and the guide bar has a length shorter than depth of the circular inner wall, when the guide bar is located in the slide groove, the movable piece and the bearing base cannot rotate with respect to each other.

In a preferred embodiment of the present invention, the guide bars are arranged at equal intervals, and the total number of the guide bars is less than the total number of the slide grooves.

In a preferred embodiment of the present invention, the outer wall of the bearing base has two oppositely positioned wrenches.

In a preferred embodiment of the present invention, the baffle has a convex piece.

In a preferred embodiment of the present invention, an adjustment structure is disposed between the hook piece and the extending piece, so that the hook piece can be elongated.

Compared with the conventional structure, the present invention has the following advantages:
1. The hook of the hook piece can be pushed out, which is convenient and quick to fix the hook to the blade in the air-outlet, and the operation is easy.
2. Before the movable piece and the shell base are used, the relative angle can be adjusted by rotating the two, the shell base can match the shape of the air-outlet, and the hook can match the blade distribution angle for the best support to suit more types of vehicles.
3. The hook piece is mounted on the extending piece retractably, thereby changing the length of the hook piece to match different blade sizes to suit more types of vehicles.
4. The present invention uses a small number of components and is easy to assembly and manufacture at a low cost.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
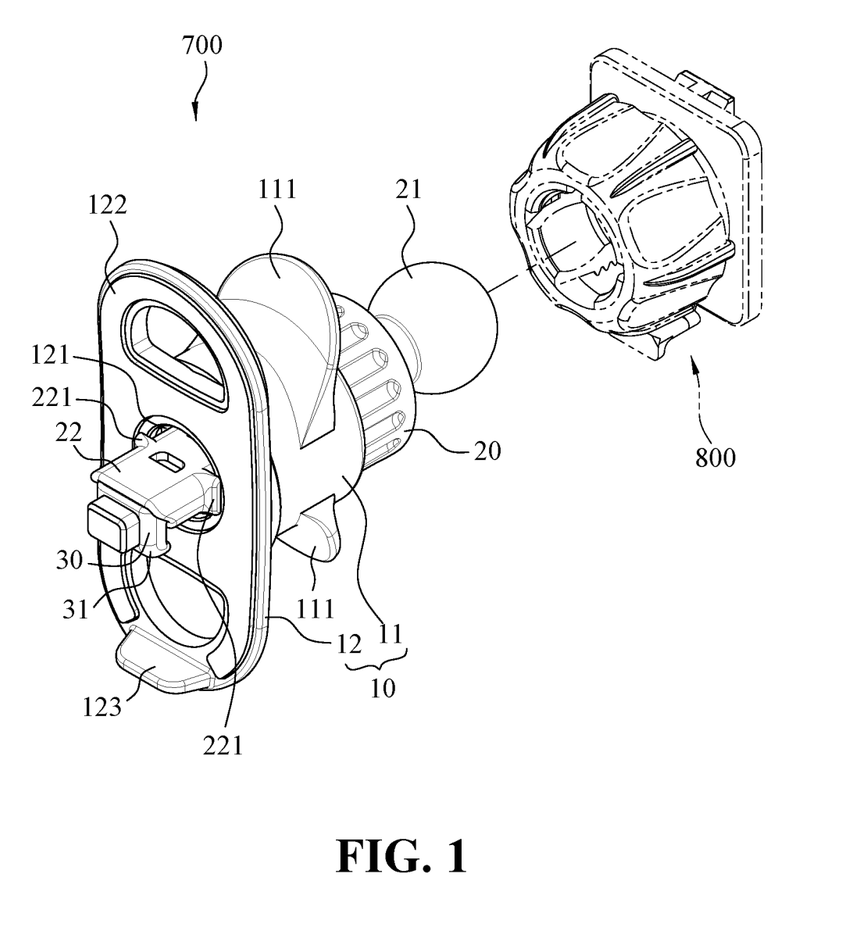
FIG. 1 is a perspective view of the positioning bracket for air-outlet of air-conditioner in vehicle of the present invention.

FIG. 1 is a perspective view of the positioning bracket for air-outlet of air-conditioner in vehicle of the present invention. The positioning bracket 700 for the air-outlet of air-conditioner in vehicle can be used with a connection assembly 800. The positioning bracket 700 is used to be fixed to the air-outlet of the air-conditioner in the vehicle, and the connection assembly 800 is used to install a mobile phone clamping device, navigation equipment, car air purification gadget, and so on. The connection assembly 800 is only as exemplary here, and can be of other different structures, such as, the back shell of the mobile phone clamping device, so that the portable electronic or various products can be fixed to the air-outlet of air-conditioner in the car through the positioning bracket 700.

Figure 2:
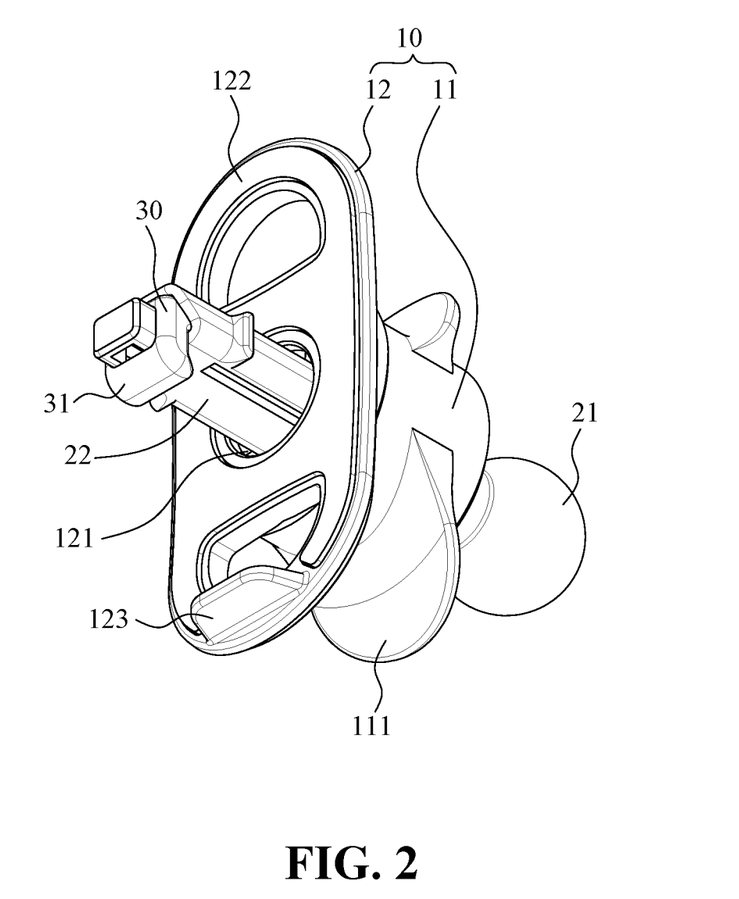
FIG. 2 is a perspective view of the positioning bracket for air-outlet of air-conditioner in vehicle of the present invention in a simulated operation.

As shown in FIG. 1, the positioning bracket 700 of the present invention includes a shell base 10, a movable piece 20 and a hook piece 30. The shell base 10 includes a bearing base 11 and a baffle 12 protruding from one end of the bearing base 11. The movable piece 20 is mounted on the bearing base 11 and is restricted to move in the direction towards the baffle 12 without disengaging from the bearing base 11. The movable piece 20 is held tight by a first spring 40 (shown in FIG. 3, FIG. 4). A connecting piece 21 extends from one end of the movable piece 20 and beyond the bearing base 2011. The connecting piece 21 is used to work with the connection assembly 800. In the present embodiment, the connecting piece 21 is, but not limited to, a spherical joint. The movable piece 20 is further provided with an extending piece 22 which extends to the outside through the baffle 12. The hook piece 30 is installed on the extending piece 22, and the hook piece 30 has a hook 31 at the front end. As shown in FIG. 2, when the movable piece 20 is pressed down and moves in the direction toward the baffle 12, the extending piece 22 extends for a longer distance, and the hook 31 can be used to hook the blades in the air-outlet of air-conditioner. When the baffle 12 is in contact with the surface of the air-outlet, the fixing of the position is achieved.

The focus of the present invention is to directly press down the movable piece 20, so that the hook 31 quickly extends and hooks the blade of the air-outlet, to achieve the easy and convenient operation, as well as fast fixation. However, for the convenience of use, the present invention also provides additional features: the movable piece 20 can be rotated before use, to change the relative angle of the hook 31 and the baffle 12, which is convenient for matching the appearance of different air-outlet. In addition, the hook piece 30 is installed on the extending piece 22 with an adjustable length designed to meet the size of the blade in the air-outlet of different models, thereby making the present invention applicable to more different models.

Figure 3:
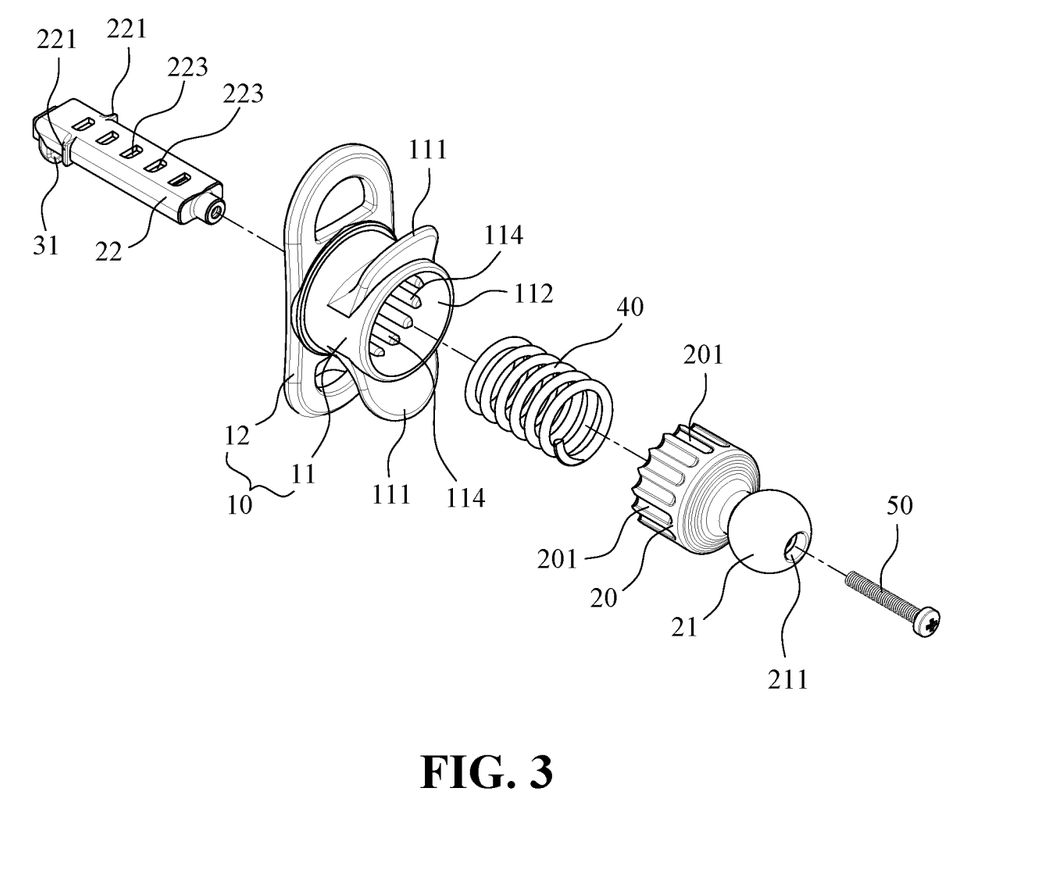
FIG. 3 is an exploded view of the positioning bracket for air-outlet of air-conditioner in vehicle of the present invention.
Figure 4:
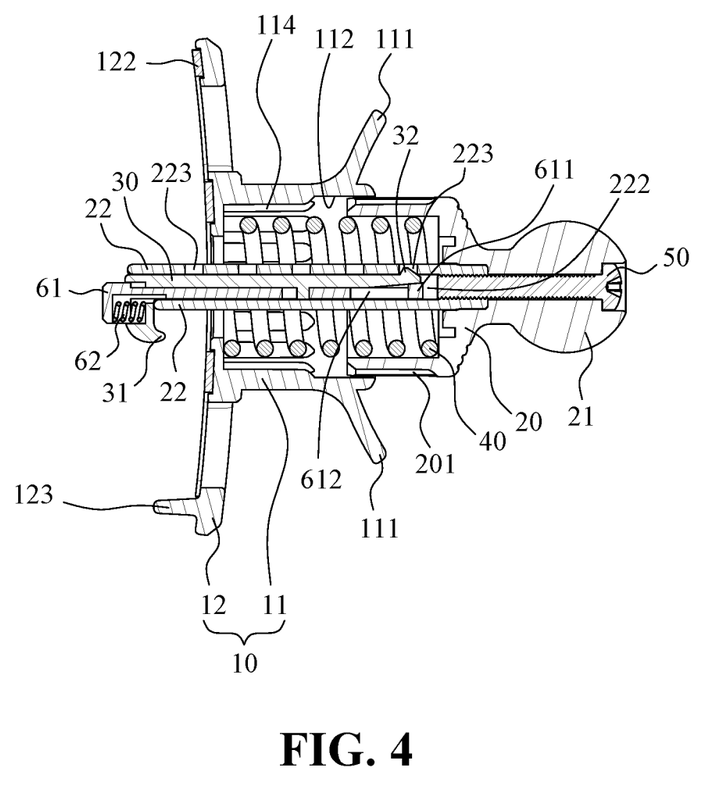
FIG. 4 is a cross-sectional view of the positioning bracket for air-outlet of air-conditioner in vehicle of the present invention.

The following describes the structure of each component of the present invention:

As shown in FIGS. 1, 3 and 4, the shell base 10 includes a bearing base 11 and a baffle 12, which is integrally formed to facilitate production and manufacturing. The baffle 12 has a hole 121 in the middle, and the hole 121 communicates with the bearing base 11. In the present embodiment, the baffle 12 is arc with a figure eight shape, and a cushion 122 is adhered on the surface. The cushion 122 is used to prevent the baffle 12 from scratching the surface of the air-outlet when coming into contact with the air-outlet. The baffle 12 further has a convex piece 123. When in use, the convex piece 123 is located between two adjacent blades to assist in positioning.

Figure 5:
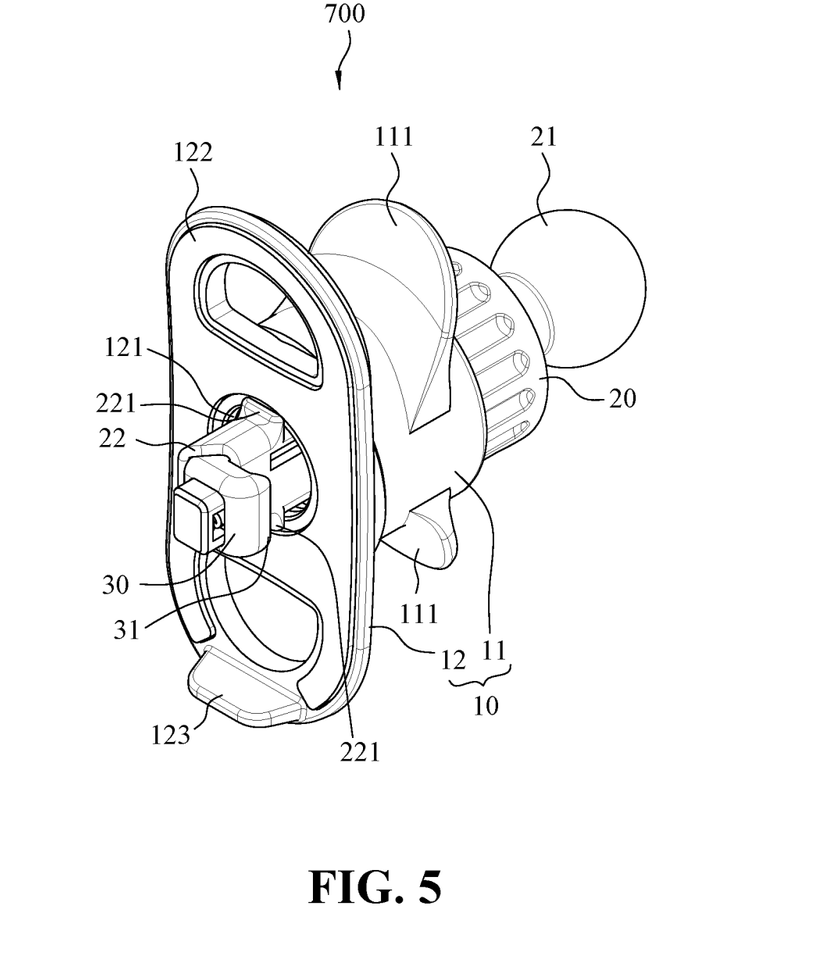
FIG. 5 is a schematic view of the hook of the positioning bracket for air-outlet of air-conditioner in vehicle of the present invention being adjusted for angle.

The bearing base 11 is a hollow base, with one end sealed by the baffle 12, and the outer wall is provided with two oppositely located wrenches 111. The wrenches 111 are provided for fingers contact, which is convenient for other fingers to press the movable piece 20 to move. A circular inner wall 112 is formed in the center of the bearing base 11. The circular inner wall 112 forms a chamber. The movable piece 20 is a cylindrical shell, installed inside the chamber, and is rotatable around the center of the circular inner wall 112 to change the relative angle of the hook 31 and the baffle 12, as shown in FIG. 5, which enables the hook 31 and the baffle 12 to be applied to different shapes of the air-outlets.

In the present invention, the movable piece 20 can only be rotated to adjust the position before use. When the hook 31 catches the blade, the movable piece 20 must not be rotated during use. In this approach of positioning, a plurality of protruding guide bars 114 are formed in a ring shape where the circular inner wall 112 is close to the baffle 12. The outer wall ring of the movable piece 20 is provided with a plurality of slide grooves 201. The length of the guide bar 114 is less than the depth of the circular inner wall 112. In other words, the area of the circular inner wall 112 adjacent to the hole is without the guide bars 114. The guide bars 114 are arranged at equal intervals and the number is less than the number of the slide grooves 201. The movable piece 20 is abutted by the first spring 40, and the other end of the first spring 40 is pressed by the baffle 12 (see FIG. 4). When the movable piece 20 is located in the area of the circular inner wall 112 without the guide bars 114, the movable piece 20 can be rotated. When the guide bars 114 is located in the slide grooves 201, the movable piece 20 and the bearing base 11 cannot rotate with respect to each other.

The movable piece 20 has the connecting piece 21 at one end, and both can be integrally formed. The shape of the connecting piece 21 depends on the connection assembly 800. The movable piece 20 is further combined with the extending piece 22. In the present embodiment, a selftapping screw 50 is used to penetrate the movable piece 20 and the extending piece 22 through a locking hole 211 on the top of the connecting piece 21 to lock together, as shown in FIG. 3 and FIG. 4. Other embodiments can also be fixed by adhesive during assembly. The extending piece 22 has a plurality of protruding portions 221 on the outer wall, and the protruding portions 221 are caught outside the baffle 12 during assembly. As such, the movable piece 20 can move in the direction toward the baffle 12 without disengaging from the bearing base 11.

Figure 6:
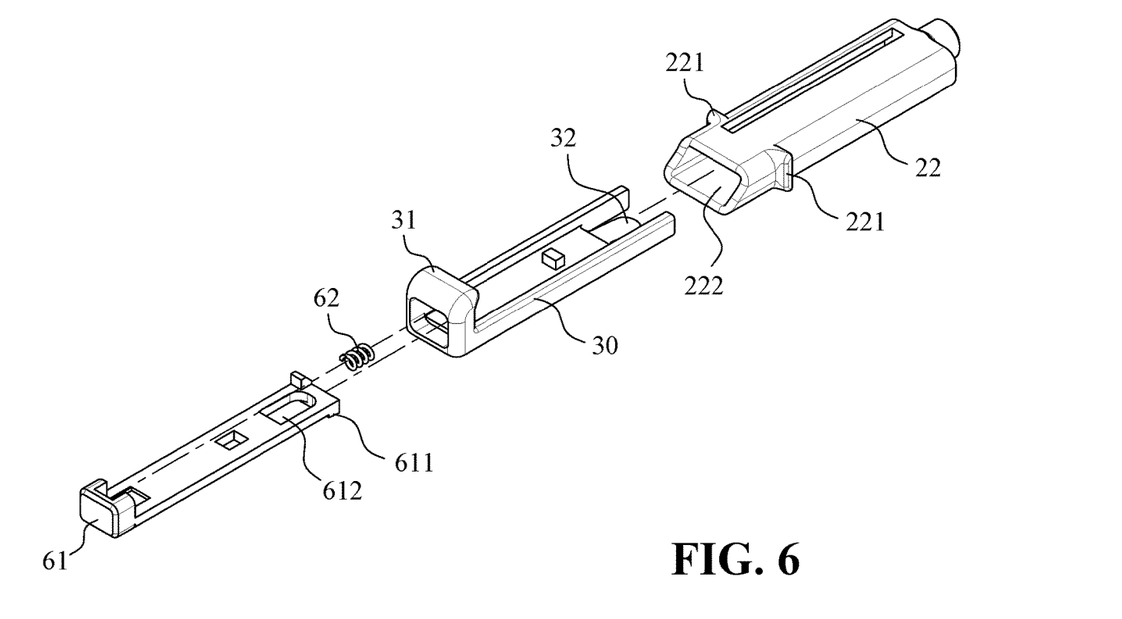
FIG. 6 is an exploded view of the hook piece and the extending piece of the positioning bracket for air-outlet of air-conditioner in vehicle of the present invention.
Figure 7:
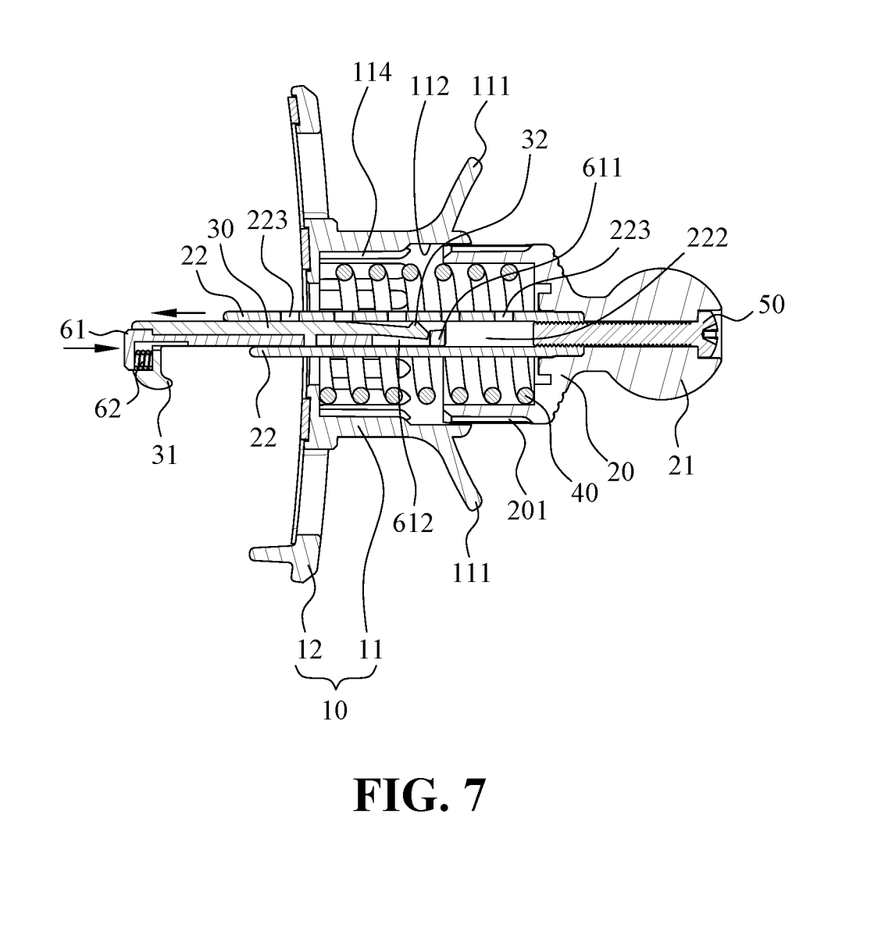
FIG. 7 is a schematic view of the internal structure when the position of the hook piece of the positioning bracket for air-outlet of air-conditioner in vehicle of the present invention is adjusted.
Figure 8:
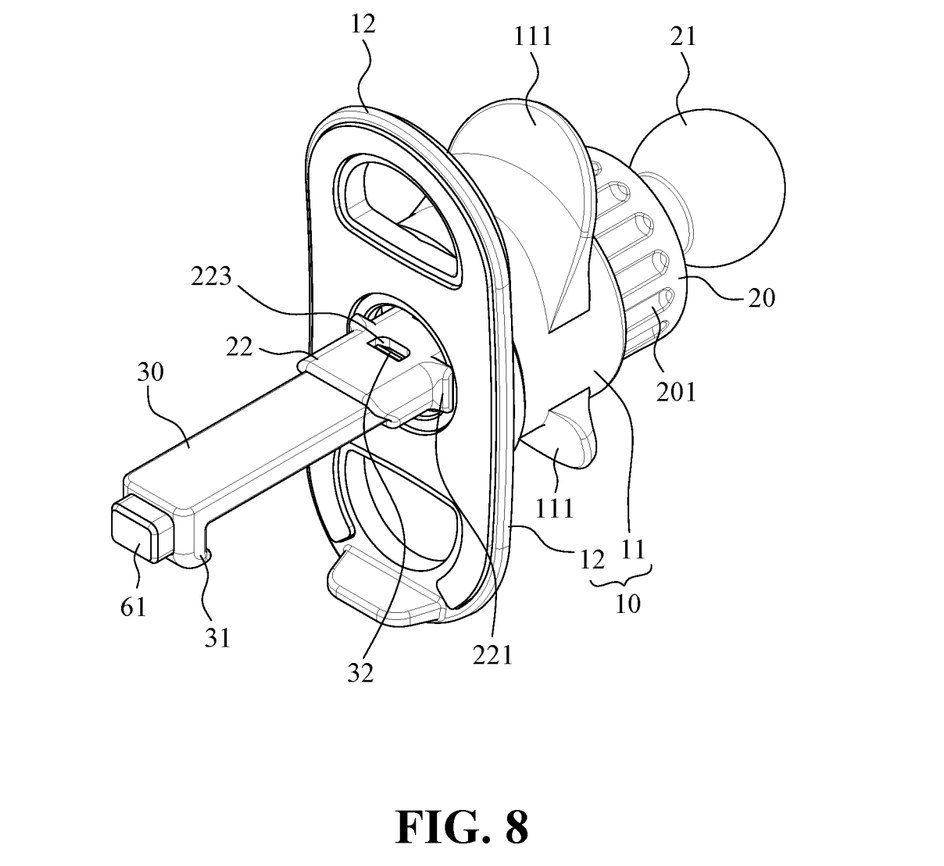
FIG. 8 is a perspective view of the state wherein the hook piece of the positioning bracket for air-outlet of air-conditioner in vehicle of the present invention is extended to the longest.

The hook piece 30 is installed on the extending piece 22, and may be of a fixed type or an adjustable type. If hook piece 30 is a fixed type, the length cannot be adjusted. To increase the scope of application, the hook piece 30 and the extending piece 22 are adjustable, that is, the hook piece 30 can be extended so as to expand the scope of application. As shown in FIG. 3, FIG. 4 and FIG. 6, the adjustment structure is disposed at the junction of the hook piece 30 and the extending piece 22, and a button 61 and a second spring 62 are additionally provided. The extending member 22 has a channel 222 and a plurality of positioning holes 223. The positioning holes 223 are arranged at equal intervals on the outer wall of the extending member 22 and communicate with the channels 222. The hook piece 30 is inserted into the channel 222 and has an elastic tooth 32 able to swing at the end. The button 61 is disposed on the hook piece 30 and can be pushed for a short distance. The second spring 62 is positioned at the front end of the hook 31 and the button 61 to provide power to restore the original position. The last section of the button 61 has a stop block 611 and a movable slot 612. After assembly, as shown in FIG. 4, the button 61 and the hook piece 30 are located in the channel 222, the elastic tooth 32 is located in the positioning hole 223, and the stop block 611 is in contact with the back of the elastic tooth 32. In this state, the hook piece 30 cannot move. As shown in FIG. 7, when the button 61 is pushed, the movable slot 612 is located in the back area of the elastic tooth 33; in this state, the hook piece 30 can be pulled to move in the channel 22 to adjust the extended length of the hook piece 30. FIG. 8 shows the longest state in which the hook piece 30 extends after adjustment.

Figure 9A:
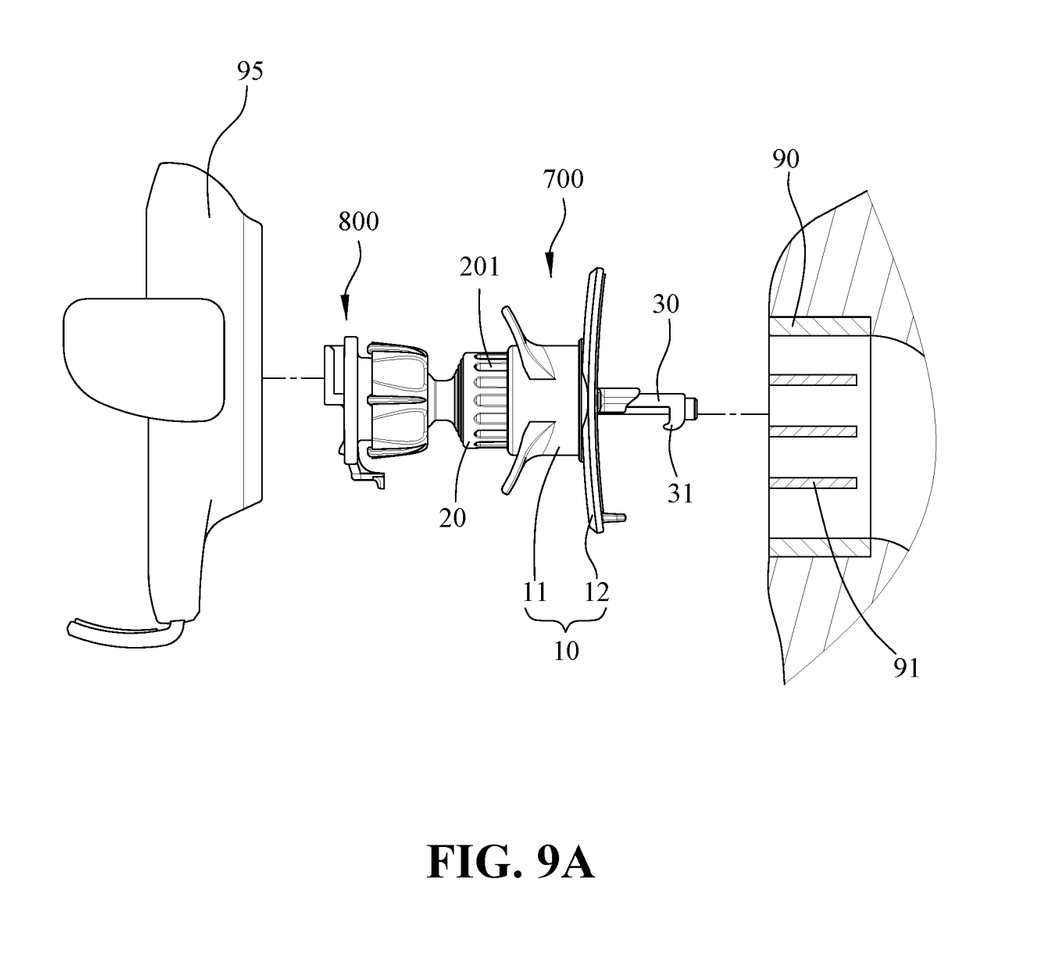
FIG. 9A is a schematic view of the preparation of the positioning bracket for air-outlet of air-conditioner in vehicle of the present invention.
Figure 9B:
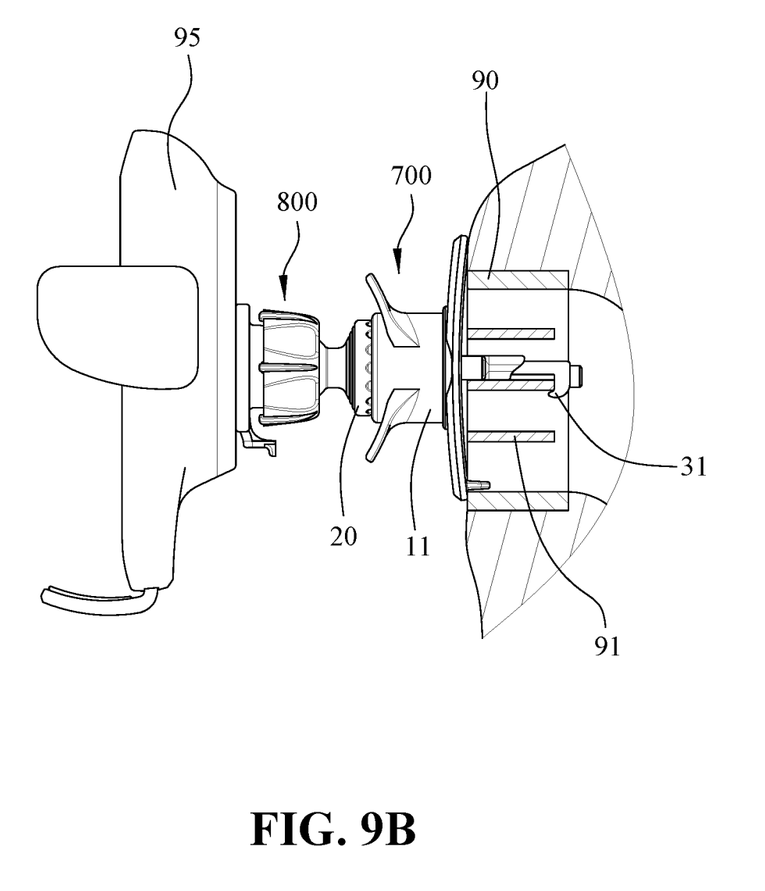
FIG. 9B is a schematic view of the actual use of the positioning bracket for air-outlet of air-conditioner in vehicle of the present invention.

As shown in FIG. 9A, a schematic view of the actual use of the present invention, the air-outlet 90 of air-conditioner in vehicle has a plurality of blades 91 that can be adjusted for the blowing angle. When in use, the movable piece 20 can be rotated first to adjust the angle of the hook 31 to match the blade 91. As shown in FIG. 9B, the end surface of the baffle 12 is in contact with the surface of the air-outlet 90, and then the movable piece 20 is pressed to make the hook 31 hook onto the edge of the blade 91. The first spring 40 maintains tightness internally, ensuring that the movable piece does not come loose during use. In addition, in this state, the guide bars 114 are distributed in some of the slide grooves 201, so the movable member 20 will not rotate in the bearing base 11. The positioning bracket 700 can be installed with a clamping device 95 by the connection assembly 800. The clamping device 95 is used to clamp a mobile phone or a car navigation device, so that various electronic products can be used at the air-outlet of the air-conditioner.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A positioning bracket for an air-outlet of an air-conditioner in a vehicle, comprising: a shell base, a movable piece and a hook piece;
    the shell base comprising: a bearing base and a baffle protruding out of one side of the bearing base, with a hole in a center of the baffle;
    the movable piece being mounted on the bearing base and restricted to move in a direction towards the baffle without leaving the bearing base, the movable piece being abutted by a first spring, the movable piece extending a connecting piece beyond the bearing base, the connecting piece being used to engage with an external mechanism, the movable piece being further disposed with an extending piece extending through the hole; and
    the hook piece being mounted in the extending piece and the hook piece having a hook as a front end;
    wherein the bearing base has a circular inner wall, the movable piece is mounted in a chamber formed by the circular inner wall; the extending piece has a plurality of protruding portions, the protruding portions engage the baffle to prevent disengagement of the movable piece from the bearing base; and
    wherein a plurality of guide bars are distributed on the circular inner wall adjacent to the baffle, a plurality of slide grooves are provided in an outer wall of the movable piece, the guide bars are shorter in length than a depth of the circular inner wall, and when the guide bars are located in the slide grooves, the movable piece and the bearing base cannot rotate with respect to each other.

2. The positioning bracket for the air-outlet of the air-conditioner in the vehicle according to claim 1, wherein the guide bars are arranged at equal intervals, and a total number of the guide bars is less than a total number of the slide grooves.

3. The positioning bracket for the air-outlet of the air-conditioner in the vehicle according to claim 1, wherein an outer wall of the bearing base has two oppositely positioned wrenches.

4. The positioning bracket for the air-outlet of the air-conditioner in the vehicle according to claim 1, wherein the baffle has a convex piece.

5. A positioning bracket for an air-outlet of an air-conditioner in a vehicle, comprising: a shell base, a movable piece, a hook piece, a button and a second spring;
    the shell base comprising: a bearing base and a baffle protruding out of one side of the bearing base, with a hole in a center of the baffle; the movable piece being mounted on the bearing base and restricted to move in a direction towards the baffle without leaving the bearing base, the movable piece being abutted by a first spring, the movable piece extending a connecting piece beyond the bearing base, the connecting piece being used to engage with an external mechanism, the movable piece being further disposed with an extending piece extending through the hole; and
    the hook piece being mounted on the extending piece and the hook piece having a hook as a front end;
    wherein an adjustment structure is disposed between the hook piece and the extending piece, so that the hook piece can be elongated, and
    wherein the adjustment structure is disposed at a junction of the hook piece and the extending piece; the extending piece has a channel and a plurality of positioning holes; the positioning holes are arranged at equal intervals on an outer wall of the extending piece and communicate with the channel; the hook piece is inserted into the channel and has an elastic tooth at an end; the button is disposed on the hook piece and is displaceable by pushing; the second spring provides a force to restore an original position of the button; a last section of the button has a stop block and a movable slot; in a fixed state, the button and the hook piece are located in the channel, the elastic tooth is located in a positioning hole of the positioning holes, and the stop block is in contact with the elastic tooth so that the hook piece cannot move;

and in an adjustable state, when the button is pushed, the stop block disengages from the elastic tooth and the moveable slot is positioned below the elastic tooth so that the hook piece can be pulled to move in the channel to adjust an extended length of the hook piece.

\* \* \* \* \*